(12) United States Patent
Kojima (10) Patent No.: US 7,843,374 B2
(45) Date of Patent: Nov. 30, 2010

(54) PRIORITY ENCODER

(75) Inventor: Shoji Kojima, Tokyo (JP)

(73) Assignee: Advantest Corporation, Tokyo (JP)

( * ) Notice: Subject to any disclaimer, the term of this patent is extended or adjusted under 35 U.S.C. 154(b) by 55 days.

(21) Appl. No.: 12/412,240

(22) Filed: Mar. 26, 2009

(65) Prior Publication Data
US 2009/0251939 A1 Oct. 8, 2009

(30) Foreign Application Priority Data
Mar. 28, 2008 (JP) ............................. 2008-088005

(51) Int. Cl.
*H03M 1/36* (2006.01)
(52) U.S. Cl. ........................................ 341/160; 341/155
(58) Field of Classification Search ................ 341/160, 341/141, 166, 155
See application file for complete search history.

(56) References Cited

U.S. PATENT DOCUMENTS

| | | | |
|---|---|---|---|
| 6,262,676 B1 * | 7/2001 | King | 341/96 |
| 7,271,757 B2 * | 9/2007 | Nakamoto et al. | 341/160 |
| 7,477,222 B2 * | 1/2009 | Koyama et al. | 345/92 |
| 2002/0032715 A1 * | 3/2002 | Utsumi | 709/103 |

FOREIGN PATENT DOCUMENTS

| | | |
|---|---|---|
| JP | 10-247842 | 9/1998 |
| JP | 2002-139553 | 5/2002 |
| JP | 2005-223912 | 8/2005 |

OTHER PUBLICATIONS

Unknown, "*8-Bit Priority Encoder*", MC14532B, pp. 1-7, ON Semiconductor, Apr. 2006, Rev. 6, Semiconductor Components Industries, LLC, <http://www.onsemi.com/pub_link/Collateral/MC14532B-D.PDF>.

* cited by examiner

*Primary Examiner*—Peguy JeanPierre
(74) *Attorney, Agent, or Firm*—Martine Penilla & Gencarella, LLP (57) ABSTRACT

A priority encoder encodes an (N+1)-bit thermometer code, where N indicates a natural number. A plurality of selectors are arranged in a matrix of M rows and (N+1) columns, where M indicates a natural number, and select one of signals at first and second input terminals (1,0) in accordance with the value of a signal input to the control terminal. An output signal from the selector in the i-th row and (j−1)th column is input to the first input terminal of the selector in the i-th row and j-th column ($1 \leq i \leq M$, $2 \leq j \leq N+1$), a predetermined value of 1 or 0 is input to the second input terminal of the selector in the i-th row and j-th column, and the j-th significant bit of the thermometer code is input to the control terminal of the selector in the i-th row and j-th column.

18 Claims, 8 Drawing Sheets

PRIORITY ENCODER

CLAIM OF PRIORITY TO RELATED APPLICATION

The present application is claiming priority of Japanese Patent Application No. 2008-088005, filed on Mar. 28, 2008, the content of which is incorporated herein by reference.

BACKGROUND OF THE INVENTION

1. Field of the Invention

The present invention relates to a priority encoder for encoding thermometer codes.

2. Description of the Related Art

A time to digital converter (hereinafter, referred to as TDC) is known as a device to convert a time difference that occurs between the timing of transition of a first signal (hereinafter, referred to as a start signal) and the timing of transition of a second signal (stop signal) into a digital value. The scheme using a Vernier delay circuit in a TDC to achieve high time resolution is proposed.

Figure 1:
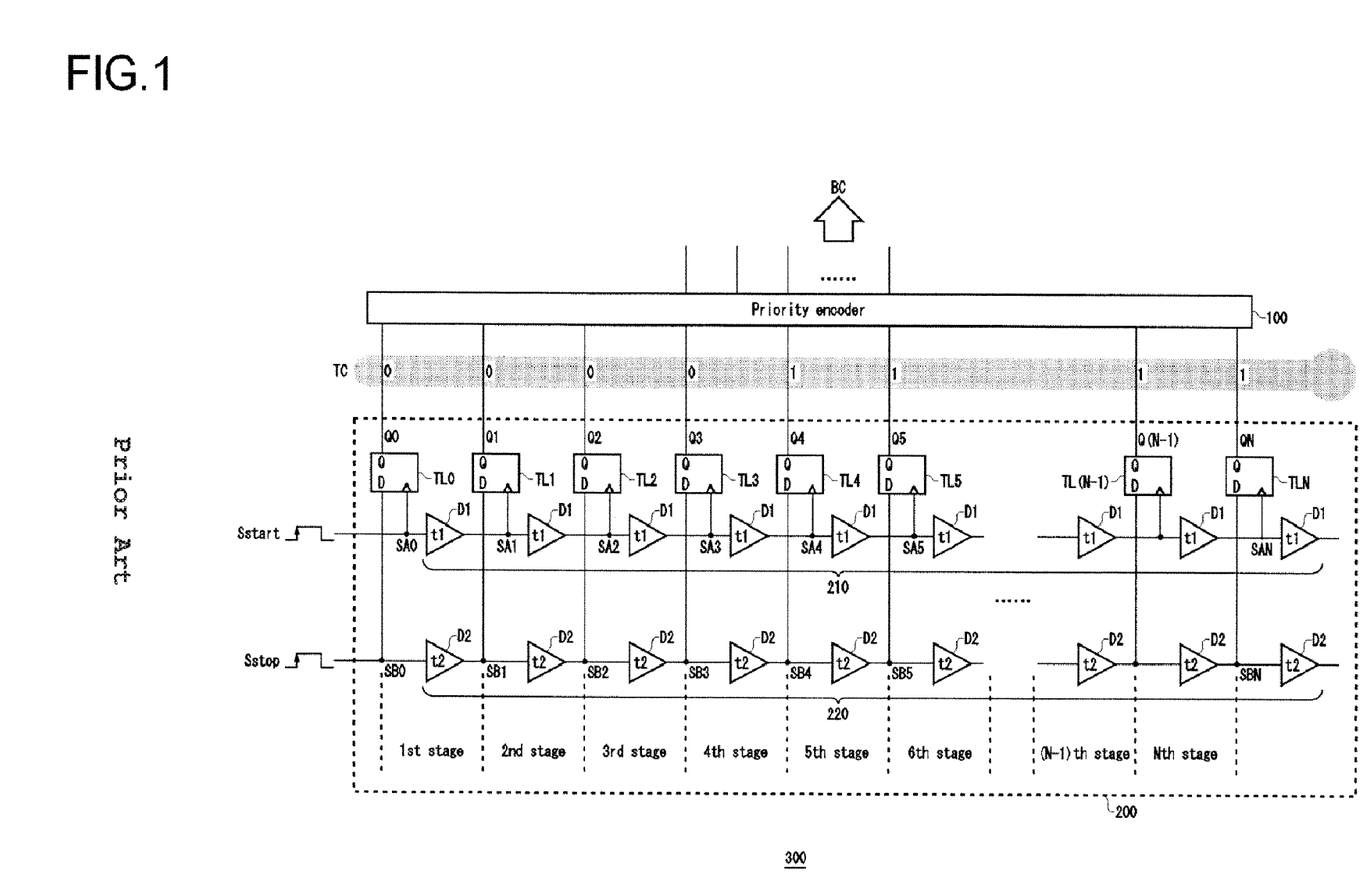
FIG. 1 shows the structure of a TDC where a Vernier delay circuit is used.

FIG. 1 shows the structure of a TDC 300 where a Vernier delay circuit 200 is used. The TDC 300 comprises a Vernier delay circuit 200 and a priority encoder 100. The Vernier delay circuit 200 receives a start signal Sstart and a stop signal Sstop and produces a thermometer code TC where a change in the values occurs at a bit position determined by a time difference. The Vernier delay circuit 200 comprises a first multi-stage delay circuit 210 and a second multi-stage delay circuit 220, and a thermometer latch TL0-TLN.

The first multi-stage delay circuit 210 includes a total of N first delay elements D1 connected to form multiple stages. The circuit 210 provides a delay of a first predetermined amount t1 to the start signal Sstart in each stage and outputs a total of (N+1) delayed start signals $SA_0$-$SA_N$ delayed by different amounts. Similarly, the second multi-stage delay circuit 220 includes a total of N second delay elements D2 connected to form multiple stages. The circuit 220 provides a delay of a second predetermined amount t2 to the stop signal Sstop in each stage and outputs a total of (N+1) delayed stop signals $SB_0$-$SB_N$ delayed by different amounts.

The first predetermined amount t1 of delay is set to be longer than the second predetermined amount t2. The time difference between the start signal Sstart and the stop signal Sstop is decreased by $\Delta t=(t1-t2)$ as the signals pass through a delay element of each stage in the first multi-stage delay circuit 210 and the second multi-stage delay circuit 220. Given that the initial time difference between the start signal Sstart and the stop signal Sstop is $\tau$, reversal of timing of the edges of the two signals occurs when the signals have passed a total of $(\tau/\Delta t)$ stages of delay elements.

The thermometer latch TLj in the j-th stage ($0 \leq j \leq N$) latches the delayed stop signal SBj output from the j-th stage when the delayed start signal SAj output from the j-th stage occurs. For convenience, a stage preceding the first stage will be refereed as a 0-th stage. In other words, the thermometer latch TL0 in the 0-th stage receives the start signal before being delayed and the stop signal before being delayed.

As a result, the output from the thermometer latch TL will be 0 until the stop signal Sstop catches up with the start signal Sstart. Once the stop signal catches up the start signal, the output from the thermometer latch TL will be 1. Thus, the data latched by a total of (N+1) thermometer latches TL0-TLN are output as the thermometer code TC [0:N]. The term thermocode derives from the fact that the bit value changes from 1 to 0 (or 0 to 1) at a particular bit in the bit series.

When the stop signal Sstop fails to catch up with the start signal Sstart, all bits of the thermometer code TC will be 0. When the stop signal Sstop is input before the start signal Sstart, all bits will be 1.

The thermometer code TC output from the Vernier delay circuit 200 is merely a bit series. Therefore, the code needs to be converted into a predetermined code (e.g., a binary code) before being imported into a computer. The priority encoder 100 encodes the thermometer code TC into, for example, a binary code.

[patent document No. 1] JP 2005-223912

[patent document No. 2] JP 2002-139553

[patent document No. 3] JP H10-247842

[non-patent document No. 1] MC14532B Product specification, 8-bit priority encoder,

[online], Internet <URL: http://www.onsemi.com/pub/Collateral/MC14532B-D.PDF>

In the related art, a priority encoder is formed by combining logic gates based on a logical table showing the correspondence between the bits of an input thermometer code and the bits of an output binary code. If the number of bits of a thermometer code TC is on the order of 10-100 bits, a priority encoder realistically sized in terms of the circuit area can be formed using the related-art scheme.

However, as the number of bits of a thermometer code reaches the order of 100-10000, the number of logical gates required grows exponentially, making it difficult to put a related-art priority encoder in use.

SUMMARY OF THE INVENTION

The present invention addresses the problem and a purpose thereof is to provide a priority encoder using a scheme different from the related art scheme.

One embodiment of the present invention relates to a priority encoder that encodes an (N+1)-bit thermometer code, where N indicates a natural number. The priority encoder comprises: a plurality of selectors arranged in a matrix of M rows and (N+1) columns, where M indicates a natural number, and operative to select one of signals at first and second input terminals in accordance with the value of a signal input to the control terminal. An output signal from the selector in the i-th row and (j−1)th column is input to the first input terminal of the selector in the i-throw and j-th column ($1 \leq i \leq M$, $2 \leq j \leq N+1$), a predetermined value of 1 or 0 is input to the second input terminal of the selector in the i-th row and j-th column, and the j-th significant bit of the thermometer code is input to the control terminal of the selector in the i-th row and j-th column.

According to the embodiment, the thermometer code can be encoded in a desired coding format, by appropriately setting the second input signal to 1 or 0. Further, the circuit area is reduced as compared to the priority encoder based on the related-art designing scheme.

The priority encoder according to an embodiment may further comprise a plurality of memory devices arranged in a matrix of M rows and N columns. Each memory device stores a predetermined value of 1 or 0. The predetermined value stored in the memory device in the i-th row and j-th column is input to the second input terminal of the selector in the i-th row and j-th column ($1 \leq i \leq M$, $1 \leq j \leq N$).

The memory device may be any device capable of storing two potentials at 1 (high level) and 0 (low level).

1 may be input to the first input terminal of the selector in the i-th row and first column ($1 \leq i \leq M$).

In this case, all bits will be 1 if the stop signal is input before the start signal.

0 may be input to the second input terminal of the selector in the i-th row and (N+1)th column ($1 \leq i \leq M$).

In this case, all bits will be 0 if the stop signal fails to catch up with the start signal.

A predetermined value $P_{i,j}$ given by $$P_{i,j} = \mathrm{int}((j-1) \bmod (2^i))/2^{i-1}$$

may be input to the second input terminal of the selector in the i-th row and j-th column ($1 \leq i \leq M$, $1 \leq j \leq N$), where mod indicates a remainder operator which yields a reminder of division and the function int(x) truncates the fractional part.

In this case, the priority encoder is capable of converting the thermometer code into a binary code.

The priority encoder according to an embodiment may further comprise M latch circuits provided for the respective rows. The latch circuit in the i-th row ($1 \leq i \leq M$) may latch an output signal from the selector in the i-th row and (N+1)th column.

The values of the bits of the thermometer code may be sequentially finalized toward the lower bits.

The selector in the j-th column receives the output signal from the selector in the (j−1)th selector and operates accordingly and so can be suitably used to encode the thermometer code where the values of the bits are sequentially finalized toward the lower bits.

The priority encoder according to an embodiment may further comprise: a plurality of D-latches arranged in a matrix of M rows and (N+1) columns. An output signal from the selector in the i-th row and j-th column may be input to the input terminal of the D-latch in the i-th row and j-th column ($1 \leq i \leq M$, $1 \leq j \leq N+1$), and a pulse signal, that goes high when the value of the j-th significant bit of the thermometer code is finalized, may be input to the gate terminal of the D-latch. The D-latch may supply its output signal to the first input terminal of the selector in the i-th row and (j+1)th column.

By providing the D-latch, the thermometer code is properly encoded even when the values thereof change in the middle of encoding.

A pair comprising the selector in the i-th row and j-th column ($1 \leq i \leq M$, $1 \leq j \leq N+1$) and the D-latch in the i-th row and j-th column may comprise first and second transfer gates. The first transfer gate may have one end thereof connected to the first input terminal of the selector, and the second transfer gate may have one end thereof connected to the second input terminal of the selector and the other end connected to the other end of the first transfer gate. One of the first and second transfer gates in the i-th row and j-th column may be turned on depending on the value of the j-th significant bit of the thermometer code while the pulse signal is at a high level.

The pair comprising the selector in the i-throw and j-th column ($1 \leq i \leq M$, $1 \leq j \leq N+1$) and the D-latch in the i-throw and j-th column may further comprise a buffer operative to receive the potential at the terminal connected in common to the first and second transfer gates.

The pair comprising the selector in the i-th row and j-th column ($1 \leq i \leq M$, $1 \leq j \leq N+1$) and the D-latch in the i-th row and j-th column may further comprise a capacitor provided between the terminal connected in common to the first and second transfer gates, and a fixed voltage terminal.

Another embodiment of the present invention relates to a time to digital converter that converts a time difference that occurs between the timing of transition of a start signal and the timing of transition of a stop signal into a digital value. The time to digital converter comprises: a Vernier delay circuit operative to produce a thermometer code where a change in the bits occurs at a position determined by a time difference between the start signal and the stop signal; and one the priority encoders as described above operative to encode the thermometer code output from the Vernier delay circuit. The Vernier delay circuit comprises a first multi-stage delay circuit, a second multi-stage delay circuit, and (N+1) thermometer latches.

The first multi-stage delay circuit includes N first delay elements connected to form multiple stages and is operative to provide a delay of a first predetermined amount to the start signal in each stage, and output (N+1) delayed start signals delayed by different amounts. The second multi-stage delay circuit includes N second delay elements connected to form multiple stages and is operative to provide a delay of a second predetermined amount to the stop signal in each stage, and output (N+1) delayed stop signals delayed by different amounts. The j-th ($0 \leq j \leq N$) thermometer latches latch the delayed stop signal output from the j-th stage when the delayed start signal output from the j-th stage arrives at the latch, and outputs the latched signal as the (j+1)th significant bit of the thermometer code.

The priority encoder may further comprise a plurality of D-latches arranged in a matrix of M rows and (N+1) columns, an output signal from the selector in the i-th row and j-th column may be input to the input terminal of the D-latch in the i-th row and j-th column ($1 \leq i \leq M$, $1 \leq j \leq N+1$), and the delayed start signal output from the k-th stage (k=j−1) may be input to the gate terminal of the D-latch, and the D-latch may supply its output signal to the first input terminal of the selector in the i-th row and (j+1)th column.

The Vernier delay circuit may comprise: (N+1) first buffers provided on the paths for outputting the (N+1) delayed start signals; and (N+1) second buffers provided on the paths for outputting the (N+1) delayed stop signals.

The N first delay elements included in the first multi-stage delay circuit and the N second delay elements included in the second multi-stage delay circuit may be inverters. The first buffers receiving outputs from the first delay elements in the odd-numbered stages and the second buffers receiving outputs from the second delay elements in the odd-numbered stages may be inverters.

The priority encoder may comprise M latch circuits provided for the respective rows, wherein an output signal from the selector in the i-th row and (N+1)th column may be input to the input terminal of the latch circuit in the i-th row ($1 \leq i \leq M$), and the delayed start signal output from the Nth stage of the first multi-stage delay circuit may be input to the clock terminal of the latch circuit.

The time to digital converter may further comprise: a setup adjustment delay circuit operative to delay the delayed start signal output from the Nth stage of the first multi-stage delay circuit and supply the signal to the clock terminals of the M latch circuits.

Still another embodiment of the present invention relates to a test apparatus. The test apparatus comprises one of the time to digital converters described above.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 2:
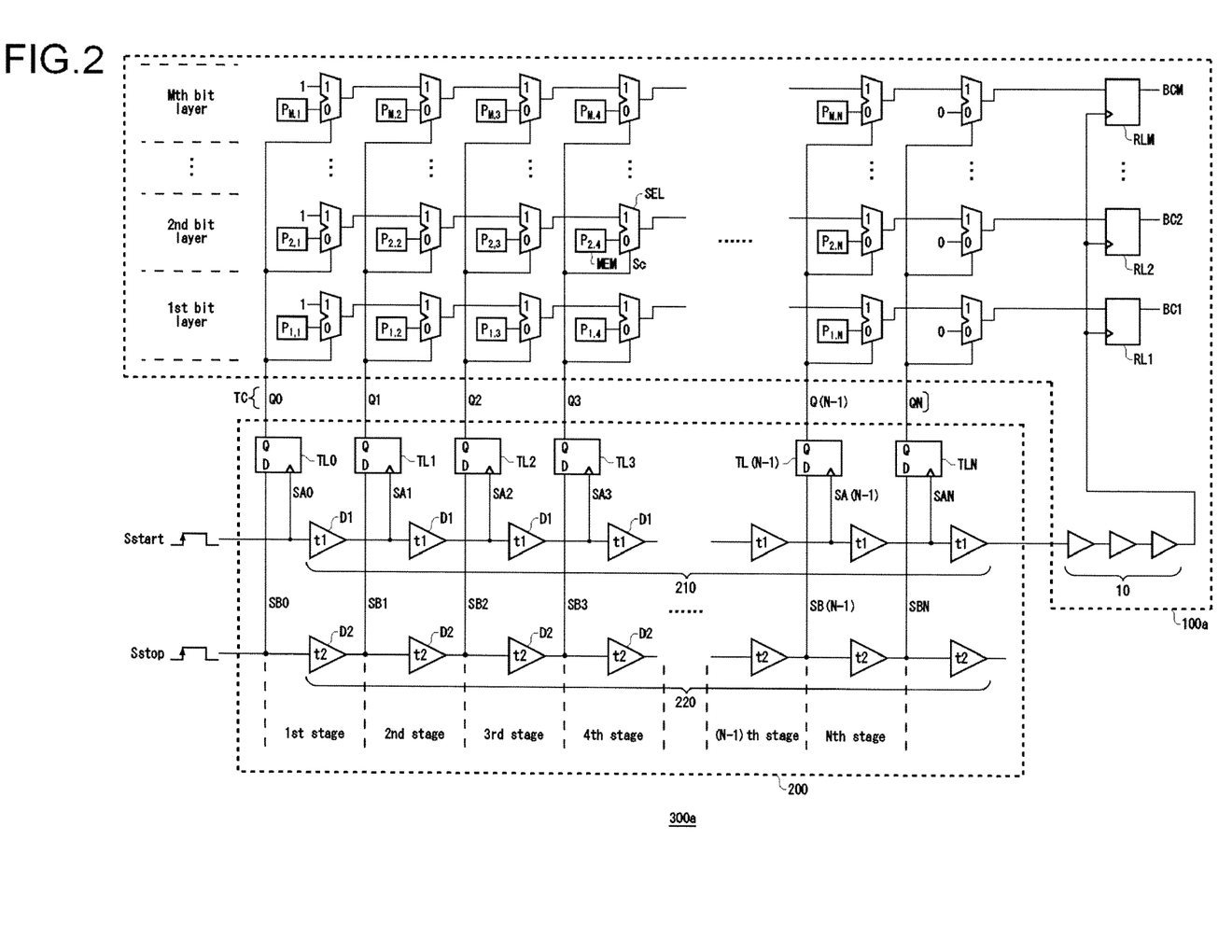
FIG. 2 shows the structure of a TDC comprising a priority encoder according to the first embodiment.

FIG. 2 shows the structure of a TDC 300a comprising a priority encoder 100a according to the first embodiment. The TDC 300a is provided in test apparatuses like automatic test equipment (ATE), time interval analyzers, and jitter measuring devices. The TDC 300a comprises a Vernier delay circuit 200 and a priority encoder 100a. The Vernier delay circuit 200 receives a start signal Sstart and a stop signal Sstop and produces an (N+1)-bit thermometer code TC[0:N] where a change in the bits occurs at a position determined by a time difference. The structure of the Vernier delay circuit 200 is similar to that of FIG. 1 so that a detailed description will be omitted. The thermometer code TC[0] represents the most significant bit MSB, and TC[N] represents the (N+1)th significant bit, i.e., the least significant bit LSB.

The priority encoder 100a encodes the (N+1)-bit thermometer code TC[0:N], where N indicates a natural number.

The priority encoder 100a comprises a plurality of selectors SEL as basic components.

The plurality of selectors SEL are arranged in a matrix of M rows and (N+1) columns, where M indicates an arbitrary natural number and may be designed according to the number of bits of encoded output data.

Each selector SEL is provided with a control terminal, a first input terminal (1), and a second input terminal (0), and selects one of the signals at the first and second input terminals, in accordance with the value of a control signal Sc input to the control terminal. More specifically, the selector selects the signal at the first input terminal (1) when the control signal Sc is at a high level (1), and selects the signal at the second input terminal (0) when the control signal Sc is at a low level (0). The selector SEL may be formed by combining AND gates and OR gates. Alternatively, the selector may be a circuit using transfer gates or a circuit using a combination of transfer gates and OR gates. The structure of the selector is non-limiting.

The output signal from the selector $SEL_{i,j-1}$ in the i-th row and (j−1)th column is input to the first input terminal (1) of the selector $SEL_{i,j}$ in the i-th row and j-th column ($1 \leq i \leq M$, $2 \leq j \leq N+1$). A predetermined value of 1 or 0 is input to the second input terminal (0) of the selector $SEL_{i,j}$. The predetermined value is set for each selector in accordance with the coding format. The j-th significant bit of the thermometer code TC is input as the control signal Sc to the control terminal of $SEL_{i,j}$.

1 is input to the first input terminal (1) of the selector $SEL_{i,1}$ in the i-th row and first column ($1 \leq i \leq M$). 0 is input to the second input terminal (0) of the selector $SEL_{i,N+1}$ in the i-th row and (N+1)th column ($1 \leq i \leq M$).

For example, when the priority encoder 100a encodes an (N+1)-bit thermometer code TC into an $int(log_2(N+1)+1)$-bit binary code BC, a predetermined value $P_{i,j}$ given by $$P_{i,j} = int((j-1) \bmod (2^i))/2^{i-1} \quad (1)$$

is input to the second input terminal (0) of the selector $SEL_{i,j}$ in the i-th row and j-th column ($1 \leq i \leq M$, $1 \leq j \leq N$), where mod indicates a remainder operator, and the function int(x) indicates an integer obtained by truncating the fractional part of the argument x, i.e., the maximum integer equal to less than the argument x.

Figure 3:
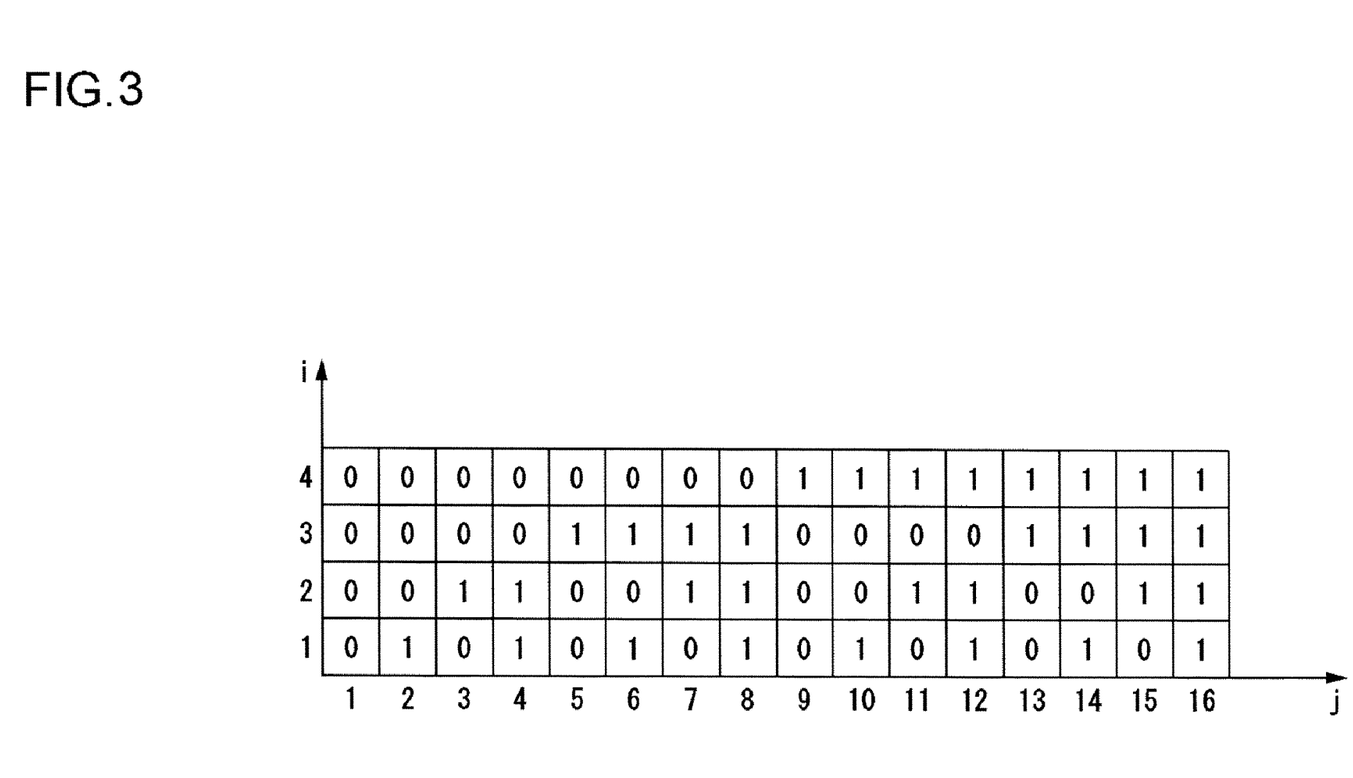
FIG. 3 shows predetermined values input to a plurality of selectors.

FIG. 3 shows a table that maintains predetermined values input to a plurality of selectors. The table of FIG. 3 lists the results computed according to expression (1) when M=4 and N=16.

The predetermined value $P_{i,j}$ may be appropriately set depending on the coding format and is not necessarily defined by expression (1). What is required is to supply, to the second input terminal (0) of the selector SEL in the j-th column, a code that should be output when a change occurs in the j-th significant bit of the thermometer code TC.

Referring back to FIG. 2, the priority encoder 100a is further provided with a plurality of memory devices MEM arranged in a matrix of M rows and N columns. Each memory device stores the predetermined value $P_{i,j}$ of 1 or 0. The predetermined value $P_{i,j}$ stored in the memory device in the i-th row and j-th column is input to the second input terminal (0) of the selector $SEL_{i,j}$ in the i-th row and j-th column ($1 \leq i \leq M$, $1 \leq j \leq N$).

The memory device may be any device capable of storing high and low potentials and producing an output accordingly. A flip-flop, latch, register, or capacitor may be used to form the memory device. It is preferable that the value $P_{i,j}$ of the memory device MEM is arbitrarily rewritable externally. A pull-up wiring (resistor) or a pull-down wiring (resistor) may be used in place of the memory device.

The priority encoder 100a is further provided with M result latches RL provided for the respective rows. The result latch RLi in the i-th row ($1 \leq i \leq M$) latches the output signal from the selector $SEL_{i,N+1}$ in the i-th row and (N+1)th column. The latch is timed to occur when the value of the output signal from the selector $SEL_{i,N+1}$ in the (N+1)th column is finalized.

The least significant bit (LSB) of the thermometer code TC is input to the control terminal of the selector $SEL_{i,N+1}$ in the (N+1)th column. The values of the bits of the thermometer code are sequentially finalized toward the lower bits. The least significant bit TC[N] is finalized when the clock signal is supplied to the thermometer latch TLN.

The clock signal supplied to the thermometer latch TLN represents the delayed start signal SAN output from N-th stage of the first multiple-stage delay circuit 210. Thus, the delayed start signal SAN output from the N-stage of the first multiple-stage delay circuit 210 is delayed before being supplied to the clock terminal of the M result latches RL. A setup adjustment delay circuit 10 is provided to delay the delayed start signal SAN. The setup adjustment delay circuit 10 would not be necessary depending on the timing of the delayed start signal SAN supplied to the result latch RLN in relation to the control signal Sc supplied to the selector $SEL_{i,N+1}$.

Figure 4:
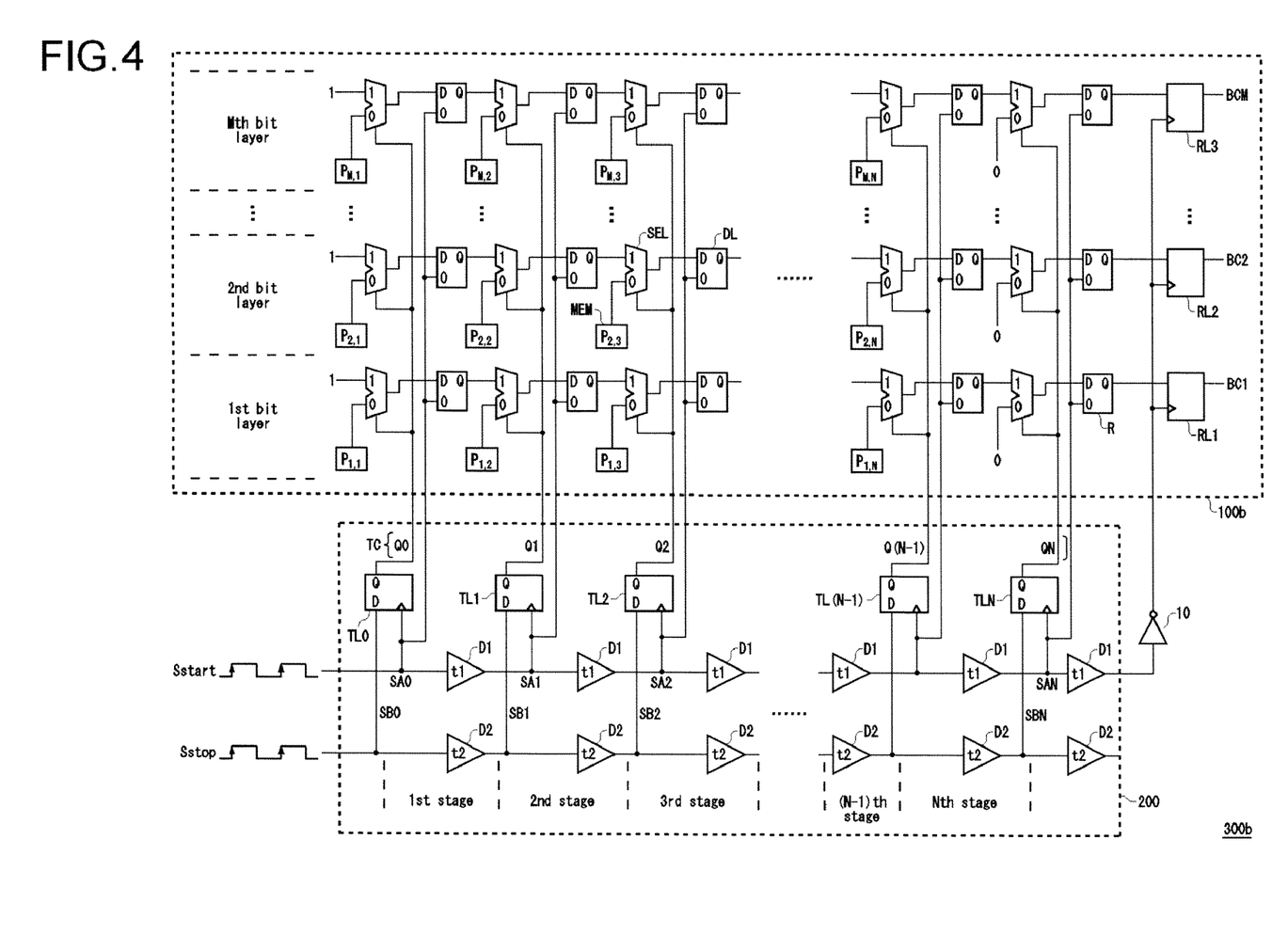
FIG. 4 shows the structure of a TDC comprising a priority encoder according to the second embodiment.

The setup adjustment delay circuit may be formed using an inverter as shown in FIG. 4.

Described above is the structure of the priority encoder 100a according to the embodiment. A description will now be given of the operation of the priority encoder 100a.

It will be assumed that the value of the bits of the thermometer code TC changes from 0 to 1 at the k-th significant bit. In other words, it will be assumed that TC[0:k−1]=0 and TC[k: N]=1

In this case, the selectors $SEL_{i,1}$-$SEL_{i,k}$ in the first through k-th columns select the value at the second input terminal (0). The selectors $SEL_{i,k+1}$-$SEL_{i,N+1}$ in the (k+1)th through (N+1) th columns select the output from the selector SEL in the preceding stage, i,e., the input to the first input terminal (1). As a result, the predetermined value $P_{i,k}$ at the second input terminal of the selector $SEL_{i,k}$ in the k-th column is propagated through the last stage and is latched by the result latch RL.

The priority encoder 100a is operated such that data is propagated from the higher bits toward the lower bits of the thermometer code. Accordingly, the priority encoder according to the embodiment can be said to be a priority encoder of propagation type.

For example, given the use of the predetermined values of FIG. 3 and given that k=3, [0010], i.e., a code in the binary representation of (k−1), is obtained as an encoded binary code BC.

The border between 0 and 1 in the thermometer code TC is determined by the time difference between the start signal Sstart and the stop signal Sstop. Accordingly, the binary code BC represents data indicating the time difference between the two signals by a digital value.

In the case of ordinary logical operation circuits, operation is started after all of the bits of the input data (thermometer code) subject to operation are finalized. In contrast, the priority encoder according to the embodiment executes the operation (selection) on the higher bits, which are finalized earlier than the lower bits, and proceeds sequentially. Therefore, the time required for encoding is reduced.

Further, since the priority encoder 100a according to the embodiment can be formed by circuit devices in M rows and N columns, the circuit area is reduced as compared to the priority encoder designed according to the related art by using a combination of logic gates.

Since 1 is input to the first input terminal (1) of the selector SEL in the i-th row and first column ($1 \leq i \leq M$), i.e., the selector in the first stage, all output bits will be 1 if the stop signal Sstop is input before the start signal Sstart. Since 0 is input to the second input terminal (0) of the selector SEL in the i-th row and (N+1)th column ($1 \leq i \leq M$), i.e., the selector in the final stage, all output bits will be 0 if the stop signal Sstop fails to catch up with the start signal Sstart.

Second Embodiment

FIG. 4 shows the structure of a TDC 300b comprising a priority encoder 100b according to the second embodiment. In addition to the thermometer code TC subject to encoding, the delayed start signals SA0-SAN produced by the first multiple-stage delay circuit 210 of the Vernier delay circuit 200 are input to the priority encoder 100b of FIG. 4.

In addition to the components of the priority encoder 100a of FIG. 2, a plurality of D-latches DL arranged in a matrix of M rows and (N+1) columns are further provided in the priority encoder 100b.

The output signal from the selector $SEL_{i,j}$ in the i-throw and j-th column is input to the input terminal of the D-latch $DL_{i,j}$ in the i-th row and j-th column ($1 \leq i \leq M$, $1 \leq j \leq N+1$). The delayed start signal SAk output from the k-th stage (k=j−1) is input to the gate terminal of the D-latch $DL_{i,j}$. The delayed signal SAk in the k-th stage is a pulse signal that goes high when the value of the j-th significant bit of the thermometer code TC, i.e., TC [j−1], is finalized. The D-latch $DL_{i,j}$ supplies its output signal to the first input terminal (1) of the selector $SEL_{i,j+1}$ in the i-th row and (j+1)th column.

A description will be given of the operation of the priority encoder 100b of FIG. 4. The D-latch $DL_{i,j}$ passes the data from the selector $SEL_{i,j-1}$ in the preceding stage while the gate terminal is at a high level, i.e., while the delayed start signal SA(j−1) is at a high level. When the delayed start signal SA(j−1) goes low, $DL_{i,j}$ latches the value occurring at the falling edge (negative edge).

The rising edge (positive edge) of the delayed start signal SA selects a code and the value thereof is sequentially held at the falling edge of the delayed start signal SA.

By using such a structure, the encoder is capable of encoding without fail thermometer codes TC obtained from two successively arriving pairs of signals, i.e., a pair of start signal Sstart and stop signal Sstop, and an additional pair of start signal Sstart and stop signal Sstop input while the preceding signals are being propagated through the Vernier delay circuit 200.

Figure 5:
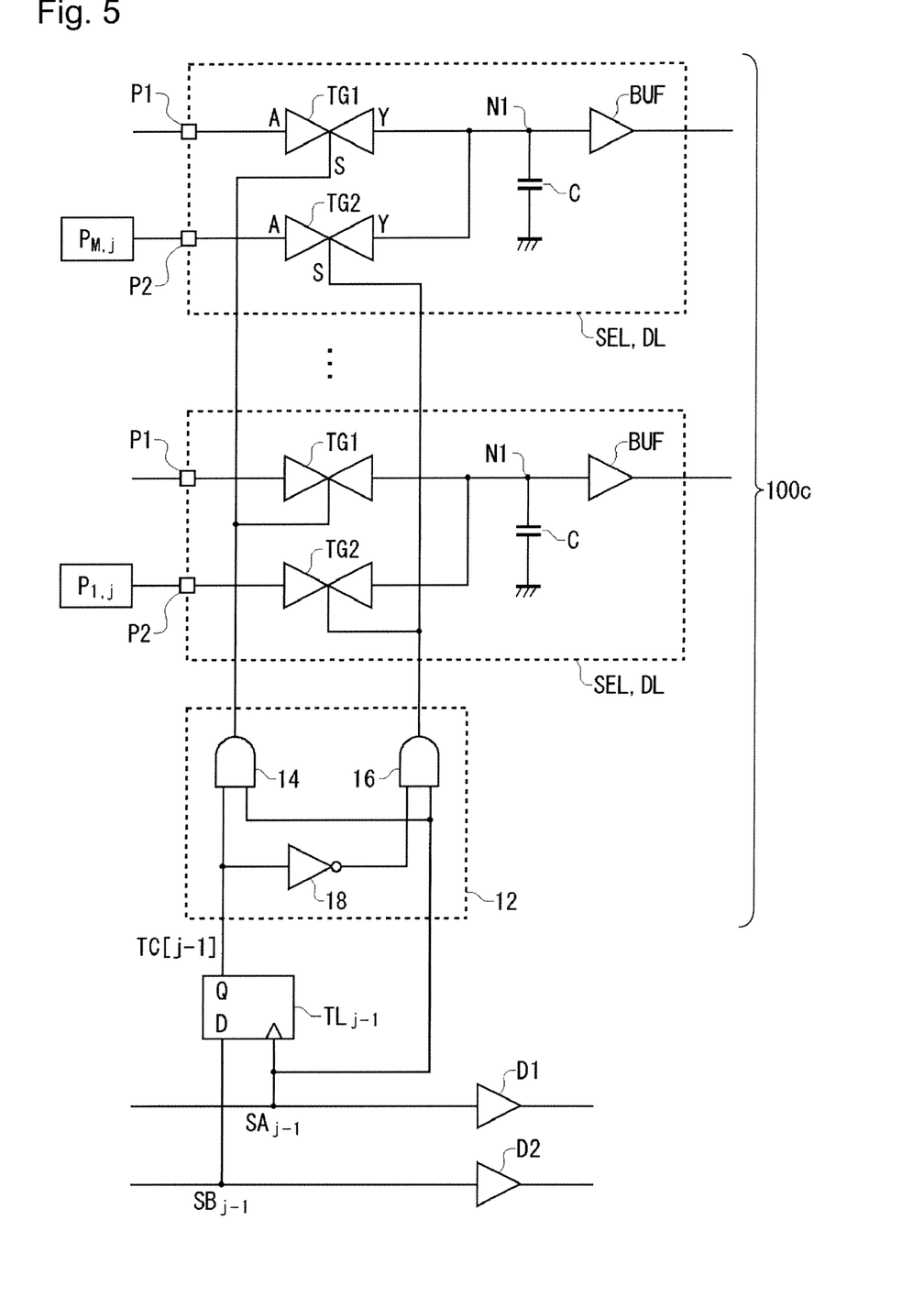
FIG. 5 is a circuit diagram showing a part of a variation of the priority encoder of FIG. 4.

FIG. 5 is a circuit diagram showing a part of a variation of the priority encoder of FIG. 4. FIG. 5 shows only the j-th column of the priority encoder 100c. The pair comprising the selector $SEL_{i,j}$ in the i-th row and j-th column ($1 \leq i \leq M$, $1 \leq j \leq N+1$) and the D-latch $DL_{i,j}$ is formed by using two transfer gates TG1 and TG2, the capacitor C, and the buffer BUF.

The first input terminal P1 corresponds to the first input terminal of the selector SEL of FIG. 4, and the second input terminal P2 corresponds to the second input terminal of the selector SEL. One end of the first transfer gate TG1 is connected to the first input terminal P1. One end of the second transfer gate TG2 is connected to the second input terminal P2 of the selector SEL. The other end of the gate TG2 and the other end of the gate TG1 are connected in common.

The first transfer gate TG1 is turned on when the value TC[j−1] of the j-th significant bit of the thermometer code TC is at a high level and when the delayed start signal SA(j−1) in the (j−1)th stage (i.e., the pulse signal indicating that the timing of finalization of the value of the j-th bit the thermometer code TC) is at a high level. At other times, the first transfer gate TG1 is turned off.

The second transfer gate TG2 is turned on when the value TC[j−1] of the j-th significant bit of the thermometer code TC is at a low level and when the delayed start signal SA(j−1) in the (j−1)th stage is at a high level. At other times, the second transfer gate TG2 is turned off.

The buffer BUF receives the potential at the terminal connected in common to the first transfer gate TG1 and the second transfer gate TG2 and outputs the potential to the circuit of the subsequent stage. The capacitor C is provided between the terminal connected in common to the first transfer gate TG1 and the second transfer gate TG2, and a fixed voltage terminal (grounding terminal).

By providing the capacitor C, the potential at a common node N1 connected in common to the transfer gates TG1 and TG2 can be properly held. By providing the buffer BUF, the impedance of the next stage as viewed from the common node N1 is ensured to be high so that the potential can be properly held. If the gate capacity of the MOSFET is sufficiently large, however, the capacitor C need not be provided. If the gate impedance of the MOSFET is sufficiently high, the buffer BUF need not be provided.

The control circuit 12 is provided for each column. The control circuit 12 includes AND gates 14 and 16, and an inverter 18.

The AND gate 14 provides the logical product of the thermometer code TC[j−1] and the delayed start signal SA(j−1) to the control terminal S of the first transfer gate TG1 in the same column.

The inverter 18 inverts the thermometer code TC[j−1]. The AND gate 16 provides the logical product of the inverted signal of the thermometer code TC[j−1] and the delayed start signal SA(j−1) to the control terminal S of the second transfer gate TG2 in the same column.

The priority encoder 100c of FIG. 5 is capable of achieving the same function as the priority encoder 100b of FIG. 4 with a simple structure.

Figure 6:
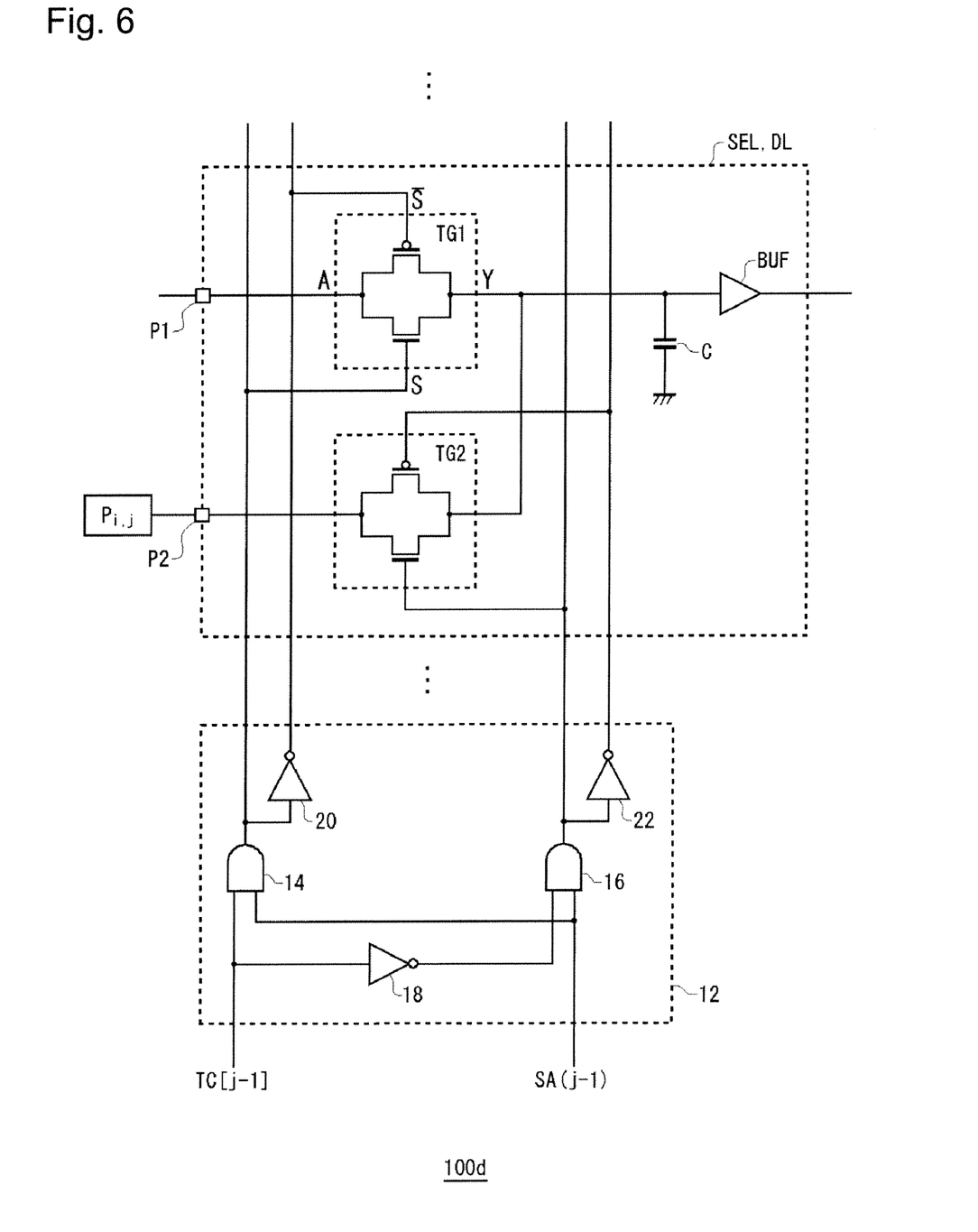
FIG. 6 is a circuit diagram showing a variation of the priority encoder of FIG. 5.

FIG. 6 is a circuit diagram showing a variation of the priority encoder of FIG. 5. A plurality of first transfer gates TG1 arranged in the same column of a priority encoder 100d of FIG. 6 share a common inverter 20 for generating a control signal *S (* denotes logical inversion) of a P-channel MOSFET forming the first transfer gate TG1.

Similarly, a plurality of second transfer gates TG2 arranged in the same column share a common inverter 22 for generating a control signal *S (* denotes logical inversion) of a P-channel MOSFET forming the second transfer gate TG2.

According to the structure, the circuit area is reduced as compared to the priority encoder 100c of FIG. 5.

The embodiments are intended to be illustrative only and it will be obvious to those skilled in the art that various modifications to constituting elements and processes could be developed and that such modifications are also within the scope of the present invention. Some such variations will be discussed.

Figure 7:
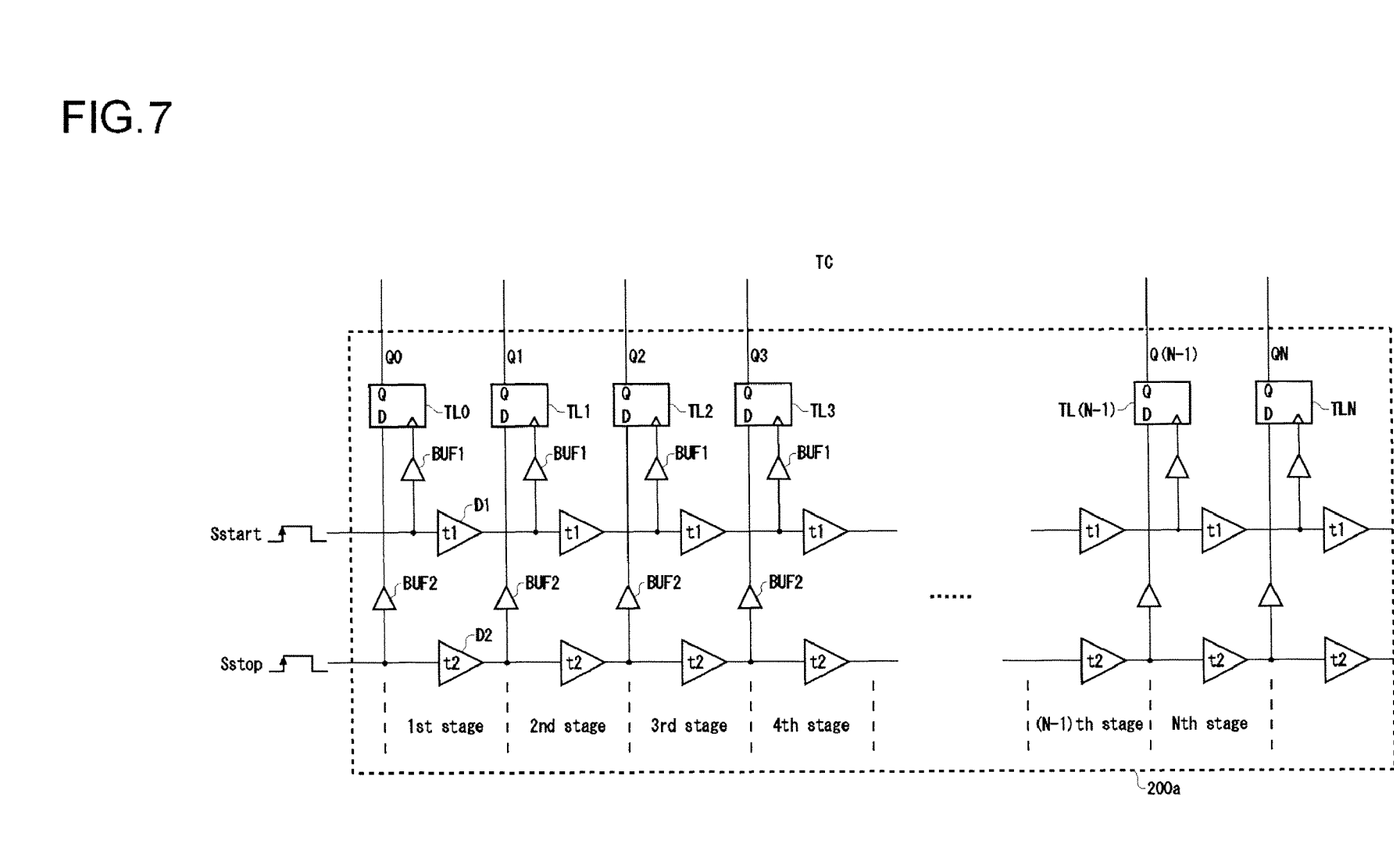
FIG. 7 is a circuit diagram showing a variation of the Vernier delay circuit.

FIG. 7 is a circuit diagram showing a variation of the Vernier delay circuit. In addition to the components of the Vernier delay circuit 200 shown in FIG. 2, etc., the Vernier delay circuit of FIG. 7 is provided with (N+1) first buffers BUF1 and (N+1) second buffers BUF2.

The first buffer BUF1 is provided on a path for outputting the (N+1) delayed start signals SA0-SAN. The second buffer BUF2 is provided on a path for outputting the (N+1) delayed stop signals SB0-SBN.

By providing the first buffer BUF1 and second buffers BUF2, the thermometer latch TL is prevented from affecting the wiring carrying the start signal Sstart or stop signal Sstop. Thereby, the signals are delayed in a stable manner.

When the Vernier delay circuit 200a of FIG. 7 is used in the priority encoder 100 of FIGS. 4 through 6, the number of fanouts of the first delay element D1 is increased. The first buffer BUF1 addresses this and ensures that the signals are delayed in a stable manner.

Figure 8:
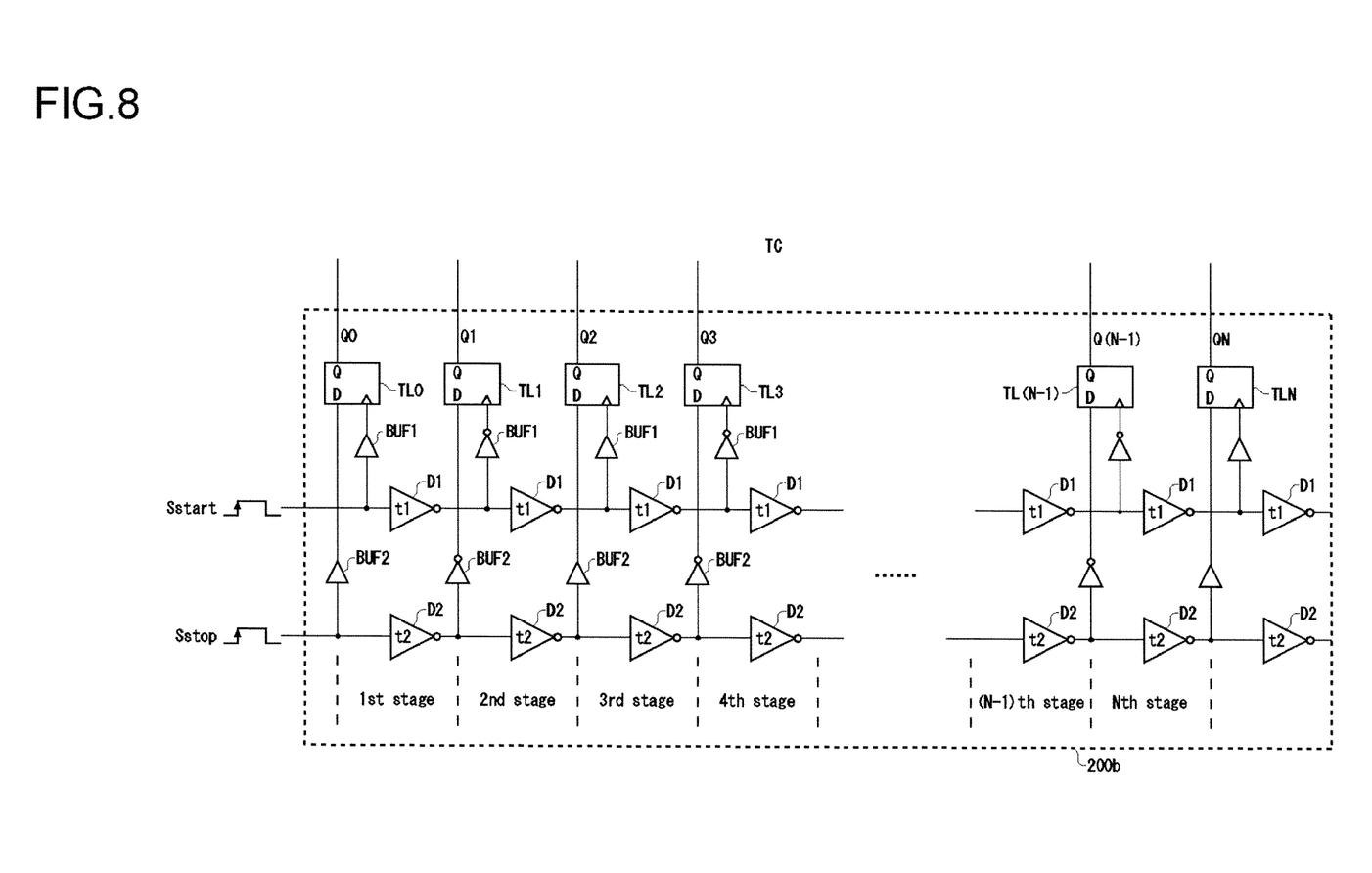
FIG. 8 is a circuit diagram showing a variation of the Vernier delay circuit of FIG. 7.

FIG. 8 is a circuit diagram showing a variation of the Vernier delay circuit of FIG. 7. In the Vernier delay circuit of FIG. 8, the N first delay elements D1 included in the first multi-stage delay circuit 210 and the N second delay elements D2 included in the second multi-stage delay circuit 220 are inverters.

The first buffers BUF1 receiving the outputs from the first delay elements D1 in the odd-numbered stages and the second buffers BUF2 receiving the outputs from the second delay elements D2 in the odd-numbered stages are formed by inverters. These circuits may be formed by differential circuits.

In the embodiments, the priority encoder 100 is assumed to be used in the TDC 300. Alternatively, the priority encoder 100 may be used in other applications. For example, the priority encoder 100 may be used to encode a thermometer code output from a flash A/D converter. The application of the priority encoder 100 is non-limiting so that the encoder may be used for any suitable applications.

In the embodiments, the thermometer code TC is described as being converted into a binary code BC. However, the priority encoder 100 may encode in any desired format. In other words, the thermometer code TC may be encoded in any desired format by supplying, to the second input terminal (0) of the selector SEL in the j-th column, a code that should be output when a change occurs in the j-th significant bit of the thermometer code TC.

While the preferred embodiments of the present invention have been described using specific terms, such description is for illustrative purposes only, and it is to be understood that changes and variations may be made without departing from the spirit or scope of the appended claims.

What is claimed is:

1. A priority encoder that encodes an (N+1)-bit thermometer code, where N indicates a natural number, the encoder comprising:
   a plurality of selectors arranged in a matrix of M rows and (N+1) columns, where M indicates a natural number, and operative to select one of signals at first and second input terminals in accordance with the value of a signal input to the control terminal and output the selected one, wherein
   an output signal from the selector in the i-th row and (j−1)th column is input to the first input terminal of the selector in the i-th row and j-th column ($1 \leq i \leq M$, $2 \leq j \leq N+1$), a predetermined value of 1 or 0 is input to the second input terminal of the selector in the i-th row and j-th column, and the j-th significant bit of the thermometer code is input to the control terminal of the selector in the i-th row and j-th column.

2. The priority encoder according to claim 1, further comprising:
   a plurality of memory devices arranged in a matrix of M rows and N columns, each memory device storing a predetermined value of 1 or 0, wherein
   the predetermined value stored in the memory device in the i-th row and j-th column is input to the second input terminal of the selector in the i-th row and j-th column ($1 \leq i \leq M$, $1 \leq j \leq N$).

3. The priority encoder according to claim 1, wherein
   1 is input to the first input terminal of the selector in the i-th row and first column ($1 \leq i \leq M$).

4. The priority encoder according to claim 1, wherein
   0 is input to the second input terminal of the selector in the i-th row and (N+1)th column ($1 \leq i \leq M$).

5. The priority encoder according to claim 1, wherein a predetermined value $P_{i,j}$ given by $$P_{i,j}=\text{int}((j-1)\bmod(2^i))/2^{i-1}$$

is input to the second input terminal of the selector in the i-th row and j-th column ($1 \leq i \leq M$, $1 \leq j \leq N$), where mod indicates a remainder operator and the function int(x) truncates the fractional part of x.

6. The priority encoder according to claim 1, further comprising:
M latch circuits provided for the respective rows, wherein the latch circuit in the i-th row ($1 \leq i \leq M$) latches an output signal from the selector in the i-th row and (N+1)th column.

7. The priority encoder according to claim 1, wherein the values of the bits of the thermometer code are sequentially finalized toward the lower bits.

8. The priority encoder according to claim 7, further comprising:
a plurality of D-latches arranged in a matrix of M rows and (N+1) columns, wherein
an output signal from the selector in the i-th row and j-th column is input to the input terminal of the D-latch in the i-th row and j-th column ($1 \leq i \leq M$, $1 \leq j \leq N+1$), and a pulse signal, that goes high when the value of the j-th significant bit of the thermometer code is finalized, is input to the gate terminal of the D-latch, and
the D-latch supplies its output signal to the first input terminal of the selector in the i-th row and (j+1)th column.

9. The priority encoder according to claim 8, wherein a pair comprising the selector in the i-th row and j-th column ($1 \leq i \leq M$, $1 \leq j \leq N+1$) and the D-latch in the i-th row and j-th column comprises:
a first transfer gate having one end thereof connected to the first input terminal of the selector; and
a second transfer gate having one end thereof connected to the second input terminal of the selector and the other end connected to the other end of the first transfer gate, wherein
one of the first and second transfer gates in the i-th row and j-th column is turned on depending on the value of the j-th significant bit of the thermometer code while the pulse signal is at a high level.

10. The priority encoder according to claim 9, wherein the pair comprising the selector in the i-th row and j-th column ($1 \leq i \leq M$, $1 \leq j \leq N+1$) and the D-latch in the i-th row and j-th column further comprises a buffer operative to receive the potential at the terminal connected in common to the first and second transfer gates.

11. The priority encoder according to claim 9, wherein the pair comprising the selector in the i-th row and j-th column ($1 \leq i \leq M$, $1 \leq j \leq N+1$) and the D-latch in the i-th row and j-th column further comprises a capacitor provided between the terminal connected in common to the first and second transfer gates, and a fixed voltage terminal.

12. A time to digital converter that converts a time difference that occurs between the timing of transition of a start signal and the timing of transition of a stop signal into a digital value, comprising:
a Vernier delay circuit operative to produce a thermometer code where a change in the bits occurs at a position determined by a time difference between the start signal and the stop signal; and
the priority encoder according to claim 1 operative to encode the thermometer code output from the Vernier delay circuit, wherein the Vernier delay circuit comprises:
a first multi-stage delay circuit including N first delay elements connected to form multiple stages and operative to provide a delay of a first predetermined amount to the start signal in each stage, and output (N+1) delayed start signals delayed by different amounts;
a second multi-stage delay circuit including N second delay elements connected to form multiple stages and operative to provide a delay of a second predetermined amount to the stop signal in each stage, and output (N+1) delayed stop signals delayed by different amounts; and
(N+1) thermometer latches, wherein
the j-th ($0 \leq j \leq N$) thermometer latches latch the delayed stop signal output from the j-th stage when the delayed start signal output from the j-th stage arrives at the latch, and outputs the latched signal as the (j+1)th significant bit of the thermometer code.

13. The time to digital converter according to claim 12, wherein
the priority encoder further comprises a plurality of D-latches arranged in a matrix of M rows and (N+1) columns,
an output signal from the selector in the i-th row and j-th column is input to the input terminal of the D-latch in the i-th row and j-th column ($1 \leq i \leq M$, $1 \leq j \leq N+1$), and the delayed start signal output from the k-th stage (k=j−1) is input to the gate terminal of the D-latch, and
the D-latch supplies its output signal to the first input terminal of the selector in the i-th row and (j+1)th column.

14. The time to digital converter according to claim 12, wherein
the Vernier delay circuit comprises:
(N+1) first buffers provided on the paths for outputting the (N+1) delayed start signals; and
(N+1) second buffers provided on the paths for outputting the (N+1) delayed stop signals.

15. The time to digital converter according to claim 14, wherein
the N first delay elements included in the first multi-stage delay circuit and the N second delay elements included in the second multi-stage delay circuit are inverters, and
the first buffers receiving outputs from the first delay elements in the odd-numbered stages and the second buffers receiving outputs from the second delay elements in the odd-numbered stages are inverters.

16. The time to digital converter according to claim 12, wherein
the priority encoder comprises M latch circuits provided for the respective rows, wherein
an output signal from the selector in the i-th row and (N+1)th column is input to the input terminal of the latch circuit in the i-th row ($1 \leq i \leq M$), and the delayed start signal output from the Nth stage of the first multi-stage delay circuit is input to the clock terminal of the latch circuit.

17. The time to digital converter according to claim 16, further comprising:
a setup adjustment delay circuit operative to delay the delayed start signal output from the Nth stage of the first multi-stage delay circuit and supply the signal to the clock terminals of the M latch circuits.

18. A test apparatus comprising the time to digital converter according to claim 12.

* * * * *